United States Patent
Suezawa

(10) Patent No.: US 11,380,032 B2
(45) Date of Patent: Jul. 5, 2022

(54) IMAGE INFORMATION PROCESSING APPARATUS, METHOD AND NON-TRANSITORY COMPUTER READABLE MEDIUM STORING PROGRAM

(71) Applicant: FUJIFILM Business Innovation Corp., Tokyo (JP)

(72) Inventor: Yoshihito Suezawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 78 days.

(21) Appl. No.: 16/672,515

(22) Filed: Nov. 3, 2019

(65) Prior Publication Data

US 2020/0334879 A1    Oct. 22, 2020

(30) Foreign Application Priority Data

Apr. 16, 2019   (JP) .............................. JP2019-077978

(51) Int. Cl.
| | |
|---|---|
| *G06F 11/00* | (2006.01) |
| *G06T 11/60* | (2006.01) |
| *G06F 40/106* | (2020.01) |
| *G06V 30/40* | (2022.01) |

(52) U.S. Cl.
CPC ............ *G06T 11/60* (2013.01); *G06F 40/106* (2020.01); *G06V 30/40* (2022.01)

(58) Field of Classification Search
None
See application file for complete search history.

(56) References Cited

U.S. PATENT DOCUMENTS

| | | | |
|---|---|---|---|
| 9,147,275 B1* | 9/2015 | Hyde-Moyer | G06K 9/033 |
| 2004/0021790 A1* | 2/2004 | Iga | H04N 1/04 |
| | | | 348/333.12 |
| 2009/0249239 A1* | 10/2009 | Eilers | G06F 3/0486 |
| | | | 715/769 |

(Continued)

FOREIGN PATENT DOCUMENTS

JP        2012203491         10/2012

OTHER PUBLICATIONS

Khalili et al., "The RDFa Content Editor—From WYSIWYG to WYSIWYM" 2012 IEEE 36th International Conference on Computer Software and Applications, copyright 2012 IEEE, p. 531-540. (Year: 2012).*

(Continued)

*Primary Examiner* — Amelia L Tapp
(74) *Attorney, Agent, or Firm* — JCIPRNET

(57) ABSTRACT

An information processing apparatus includes an input receiving section that receives an input of a captured image in which a first object and a second object installed in association with the first object are recorded; a first image acquisition section that acquires a first object image that is an image of the first object extracted from the captured image; a second image acquisition section that acquires a second object image that is an image of the second object extracted from the captured image; and a display control section that displays both the first object image and the second object image, the display control section displaying the first object image and the second object image in a state where the second object image is movable relative to the first object image or in a state where the second object image is editable.

20 Claims, 14 Drawing Sheets

(56) References Cited

U.S. PATENT DOCUMENTS

| | | | |
|---|---|---|---|
| 2014/0201264 A1* | 7/2014 | Soon-Shiong | G06F 3/03 |
| | | | 709/203 |
| 2016/0328827 A1* | 11/2016 | Ilic | H04N 5/2624 |
| 2018/0032481 A1* | 2/2018 | Ishida | G06F 3/0485 |

OTHER PUBLICATIONS

Coustaty et al., "Augmented Documents for Research Contact Management" copyright 2018 IEEE, 6 pages. (Year: 2018).*

* cited by examiner

FIG. 12
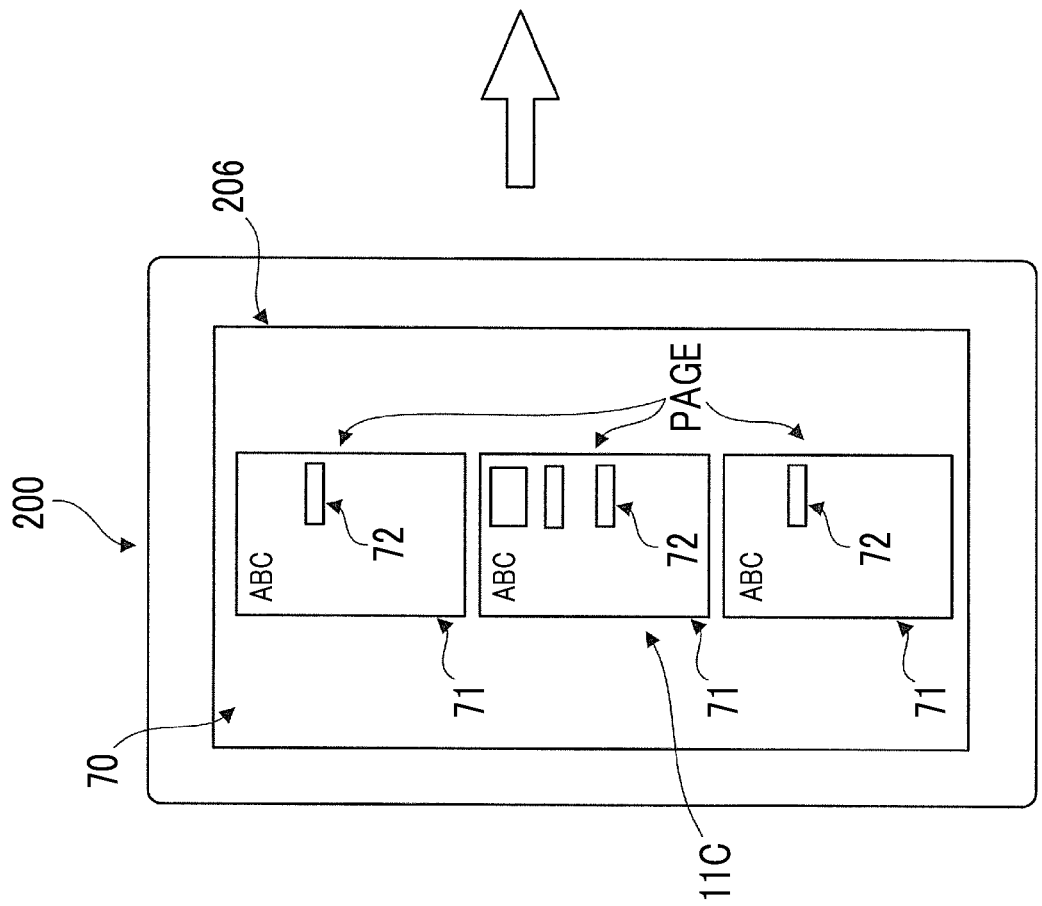
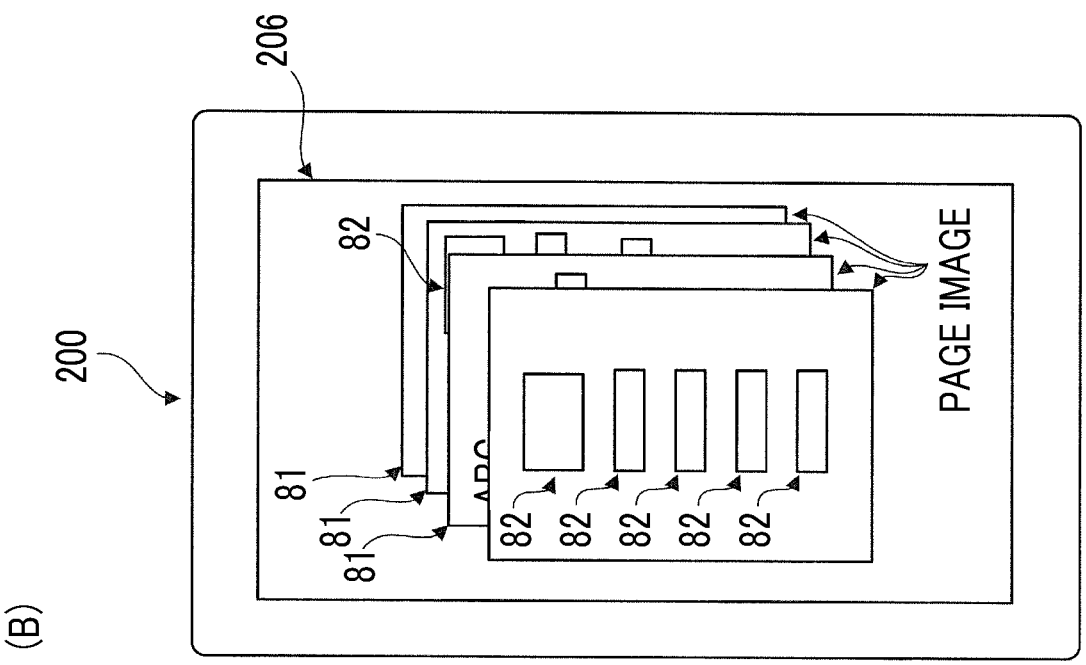

IMAGE INFORMATION PROCESSING APPARATUS, METHOD AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-077978 filed Apr. 16, 2019.

BACKGROUND

(i) Technical Field

The present invention relates to an information processing apparatus and a non-transitory computer readable medium storing a program.

(ii) Related Art

JP-A-2012-203491 discloses a process of extracting a handwriting part from image data obtained by digitizing a document medium including the handwriting part, and adding to the image data, the contents of the extracted image data as tab information.

SUMMARY

In a captured image obtained by capturing a first object and a second object installed in association with the first object, the second object may not be moved relative to the first object, or the second object may not be edited independently of the first object.

Aspects of non-limiting embodiments of the present disclosure relate to an information processing apparatus and a non-transitory computer readable medium storing a program capable of displaying an image in which the second object can be moved relative to the first object, or the second object can be edited independently of the first object, from an input of a captured image in which a first object and a second object installed in association with the first object are recorded.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including an input receiving section that receives an input of a captured image in which a first object and a second object installed in association with the first object are recorded; a first image acquisition section that acquires a first object image that is an image of the first object extracted from the captured image; a second image acquisition section that acquires a second object image that is an image of the second object extracted from the captured image; and a display control section that displays both the first object image and the second object image, the display control section displaying the first object image and the second object image in a state where the second object image is movable relative to the first object image or in a state where the second object image is editable.

BRIEF DESCRIPTION OF THE DRAWINGS

Exemplary embodiment(s) of the present invention will be described in detail based on the following figures, wherein:

FIG. 12 is a diagram illustrating another example of processing related to a captured image;

DETAILED DESCRIPTION

Hereinafter, an exemplary embodiment of the present invention will be described in detail with reference to the accompanying drawings.

Figure 1:
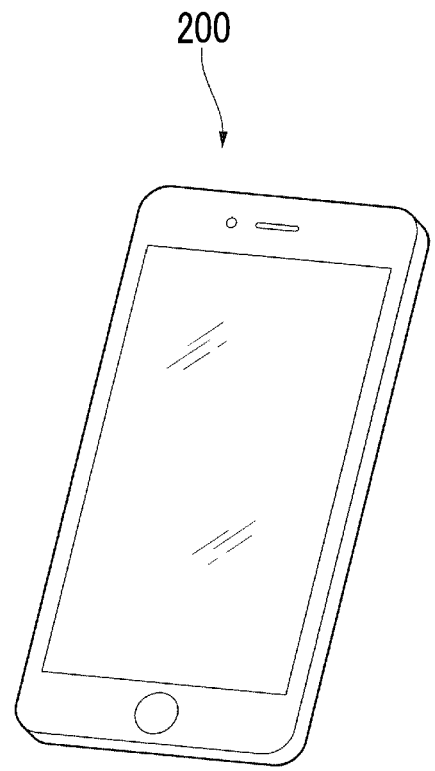
FIG. 1 is a diagram illustrating a configuration of an information processing apparatus.

FIG. 1 is a diagram illustrating a configuration of an information processing apparatus.

As illustrated in FIG. 1, an information processing apparatus 200 according to the present exemplary embodiment is a device such as a so-called smartphone or tablet terminal.

Note that the information processing apparatus 200 is not limited to a smartphone or a tablet terminal, and may be a notebook computer apparatus, a desktop computer apparatus, or the like.

In the present exemplary embodiment, as described below, an operation performed by the operator is received by a display device which is a touch panel, but an operation of the operator may be received by an information input device such as a mouse.

Figure 2:
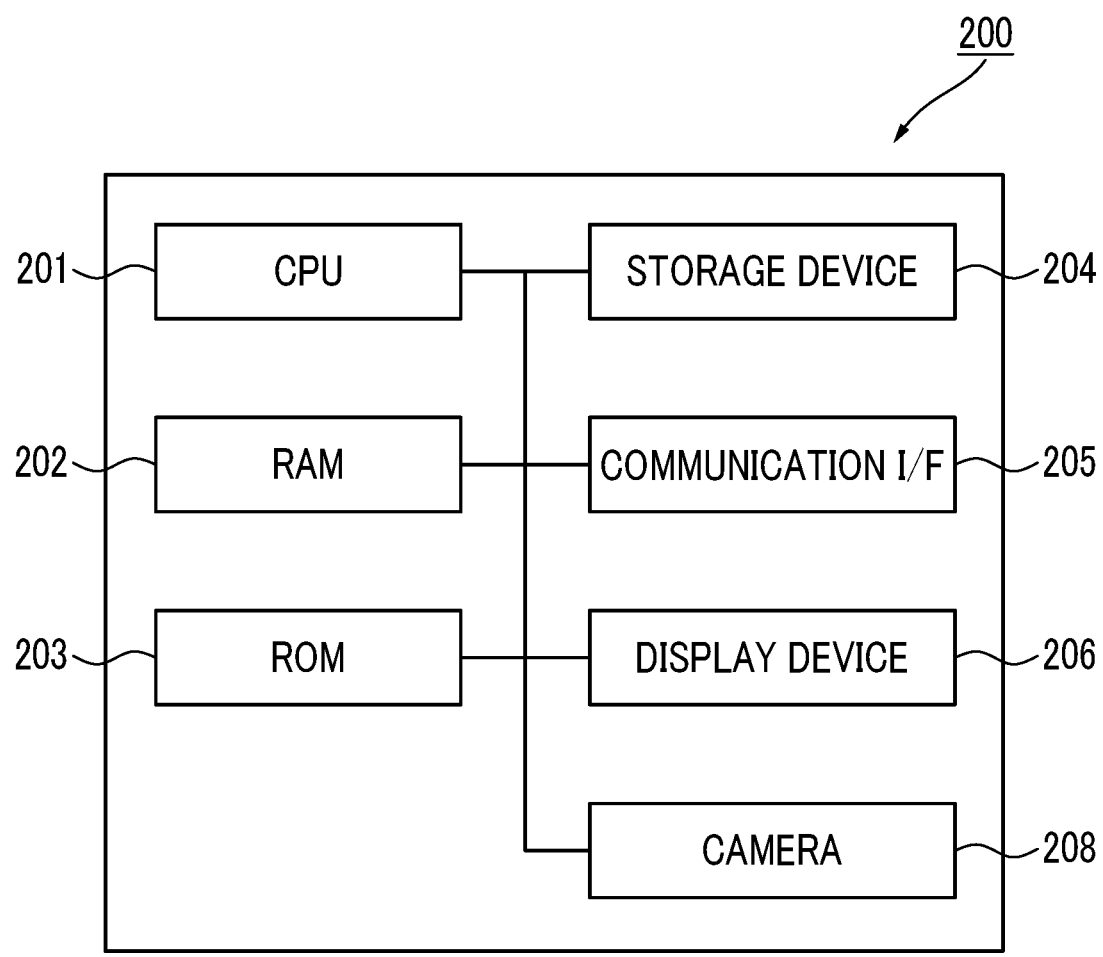
FIG. 2 is a diagram illustrating a hardware configuration of the information processing apparatus.

FIG. 2 is a diagram illustrating a hardware configuration of the information processing apparatus 200.

The information processing apparatus 200 according to the present exemplary embodiment includes a central processing unit (CPU) 201, a random access memory (RAM) 202, and a read only memory (ROM) 203.

In addition, a storage device 204 which is a flash memory or the like is provided.

In addition, the information processing apparatus 200 is provided with a communication interface (communication I/F) 205 for performing communication with the outside, a display device 206 that displays information, and a camera 208 that captures an imaging target.

The display device 206 is a touch panel display, for example.

Further, the camera 208 is an image sensor, such as CCD, for example.

Here, the program executed by the CPU 201 may be provided to the information processing apparatus 200 by being recorded in a computer-readable recording medium such as a magnetic recording medium (such as a magnetic tape and a magnetic disk), an optical recording medium (such as an optical disk), a magneto-optical recording medium, and a semiconductor memory.

Further, the program executed by the CPU 201 may be downloaded to the information processing apparatus 200 by using a communication section such as the Internet.

Figure 3:
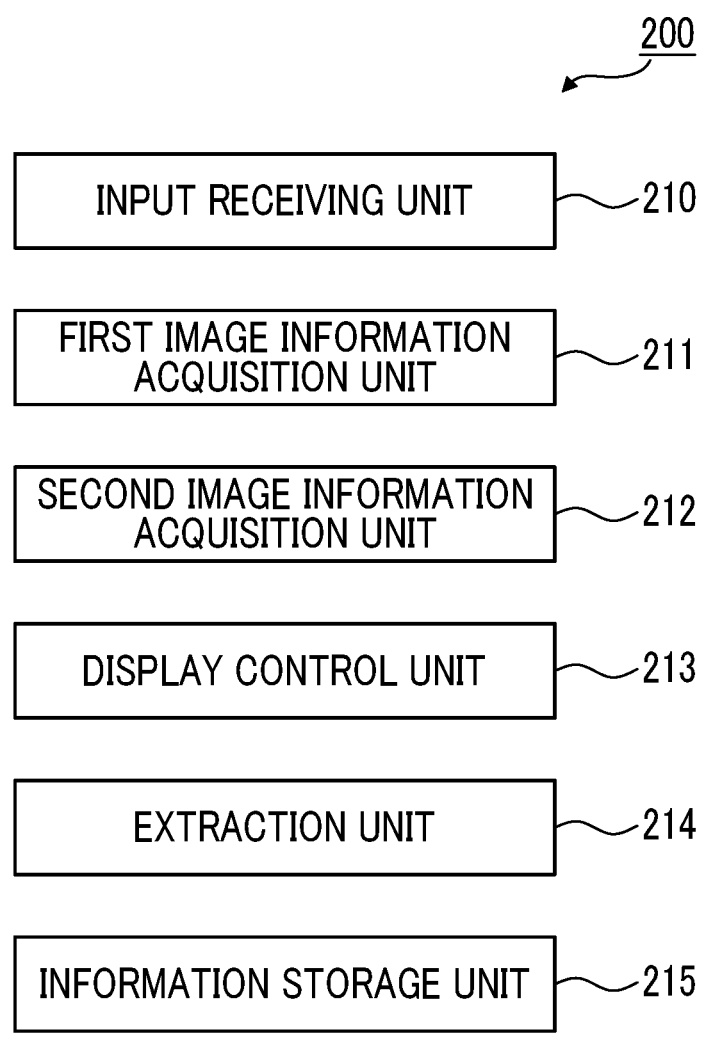
FIG. 3 is a diagram illustrating functional units realized by a CPU or the like of the information processing apparatus.

FIG. 3 is a diagram illustrating functional units realized by the CPU 201 or the like of the information processing apparatus 200.

In FIG. 3, functional units related to display of a first object image and a second object image, which will be described later, are displayed.

As illustrated in FIG. 3, the information processing apparatus 200 includes an input receiving unit 210, a first image information acquisition unit 211, a second image information acquisition unit 212, a display control unit 213, an extraction unit 214, and an information storage unit 215.

In the present exemplary embodiment, the CPU 201 executes a program stored in the ROM 203 or the storage device 204, whereby the functional unit of each of the input receiving unit 210, the first image information acquisition unit 211, the second image information acquisition unit 212, the display control unit 213, and the extraction unit 214 is realized.

The information storage unit 215 is realized by the storage device 204.

The input receiving unit 210 as an example of an input receiving section receives an input of a captured image obtained by the camera 208 or the like.

The first image information acquisition unit 211 as an example of a first image information acquisition section acquires a first object image that is an image of a first object extracted from the captured image.

The second image information acquisition unit 212 as an example of a second image information acquisition section acquires a second object image that is an image of a second object extracted from the captured image.

The display control unit 213 as an example of a display control section controls display on the display device 206.

The extraction unit 214 as an example of an extraction section extracts an object having a predetermined feature from the captured image.

The information storage unit 215 stores information related to the captured image.

Figure 4:
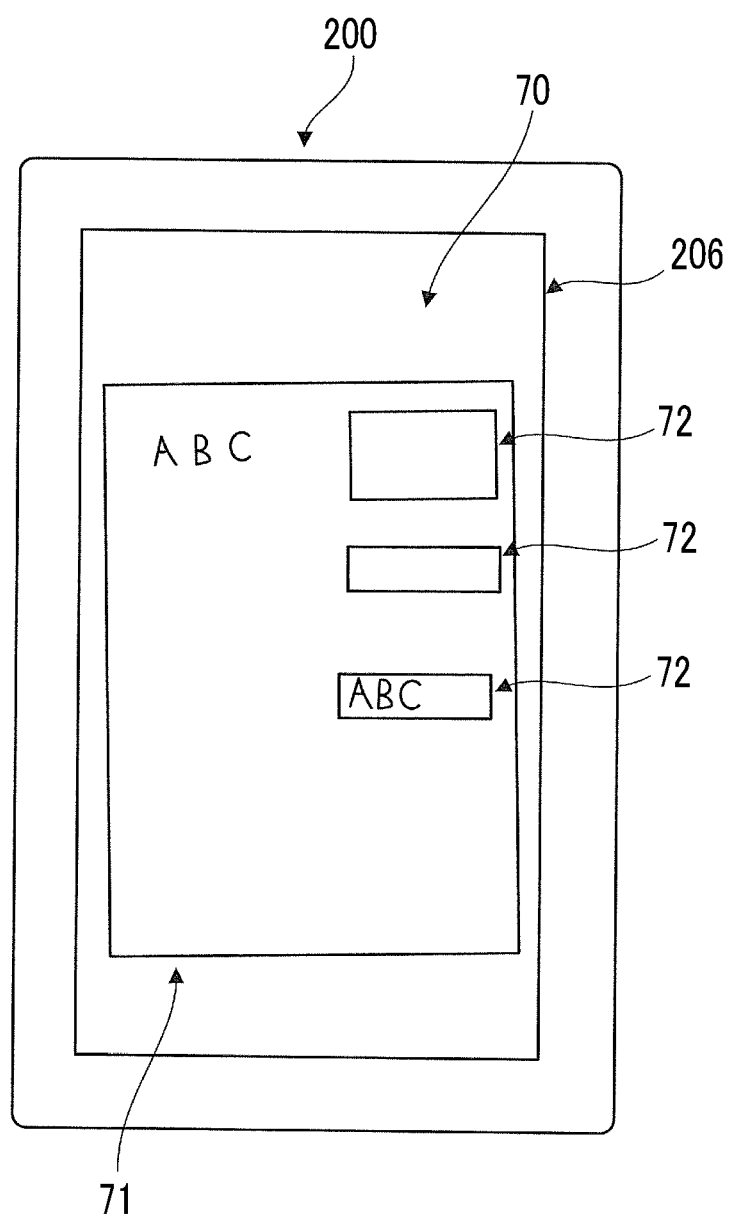
FIG. 4 is a diagram illustrating an example of a captured image received by an input receiving unit.

FIG. 4 is a diagram illustrating an example of the captured image received by the input receiving unit 210.

In the present exemplary embodiment, the input receiving unit 210 acquires the captured image 70 obtained by the camera 208.

In other words, in the present exemplary embodiment, the captured image 70 obtained by the camera 208 is input to the input receiving unit 210, and the input receiving unit 210 receives this input of the captured image 70.

Here, in the present exemplary embodiment, a case where the captured image 70 obtained by the camera 208 is input to the input receiving unit 210 will be described as an example.

However, the present invention is not limited to this, and the captured image 70 obtained by the imaging section provided outside the information processing apparatus 200 is transmitted to the information processing apparatus 200, so the captured image 70 may be input to the input receiving unit 210.

The captured image 70 shown in FIG. 4 is a captured image 70 in which a first object 71 and a second object 72 installed in association with the first object 71 are recorded together.

More specifically, the captured image 70 is a captured image 70 in which a rectangular document that is an example of the first object 71 and a rectangular tag that is an example of the second object 72 are recorded together.

In the captured image 70 of the present exemplary embodiment, plural tags (second objects 72) are recorded.

In the present exemplary embodiment, a document is exemplified as the first object 71, and a tag smaller than the document is exemplified as the second object 72. However, the first object 71 and the second object 72 are not limited to these.

For example, as the first object 71, a three-dimensional object such as a product can be cited as an example, and as the second object 72, an object attached to the three-dimensional object can be cited as an example.

This attached object is not limited to a planar object but may be a three-dimensional object.

In the following, a process in a case where the captured image 70 in which the first object 71 and the second object 72 overlap is input to the input receiving unit 210 will be described as an example, but the following processing can be performed even on the captured image 70 in which the first object 71 and the second object 72 do not overlap each other.

Figure 5:
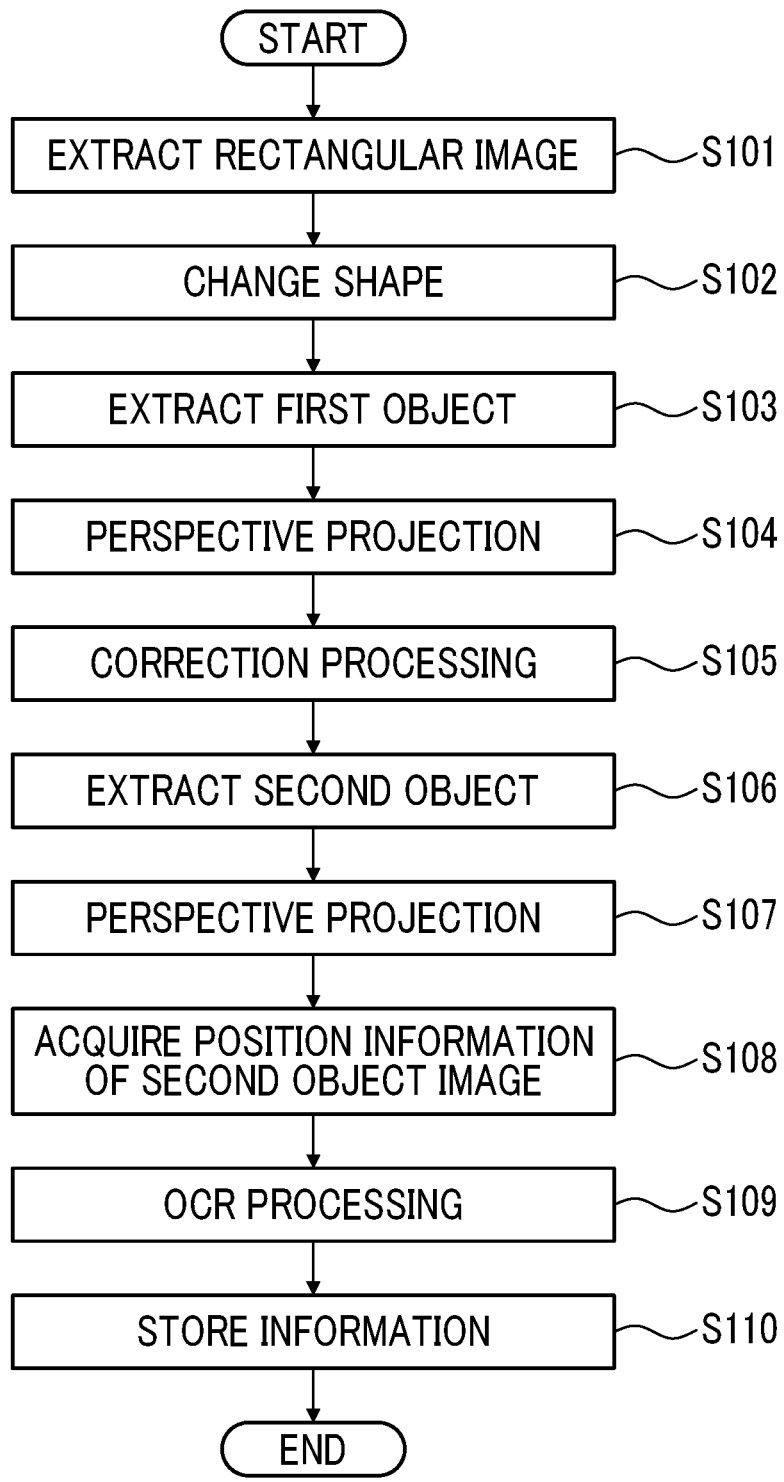
FIG. 5 is a flowchart illustrating a flow of processing executed by the information processing apparatus regarding a captured image.
Figure 6:
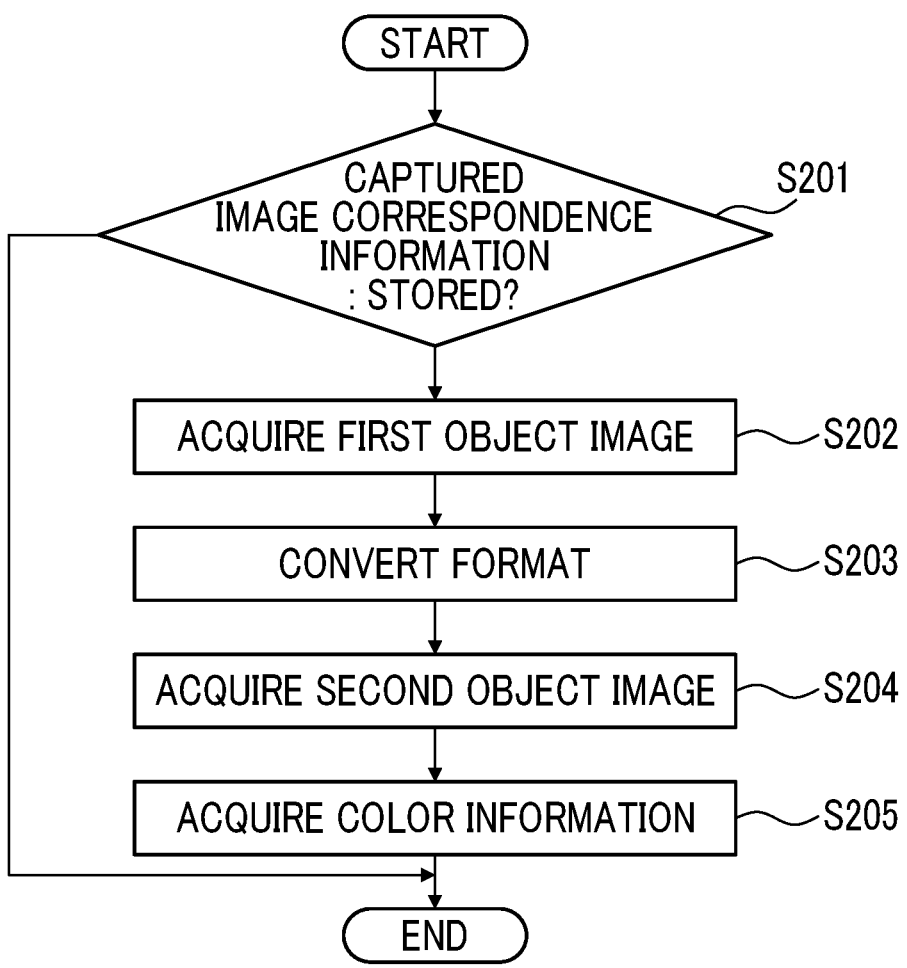
FIG. 6 is a flowchart illustrating a flow of processing executed by the information processing apparatus regarding a captured image.

FIGS. 5 and 6 are flowcharts showing the flow of processing executed by the information processing apparatus 200 regarding the captured image 70.

Figure 7:
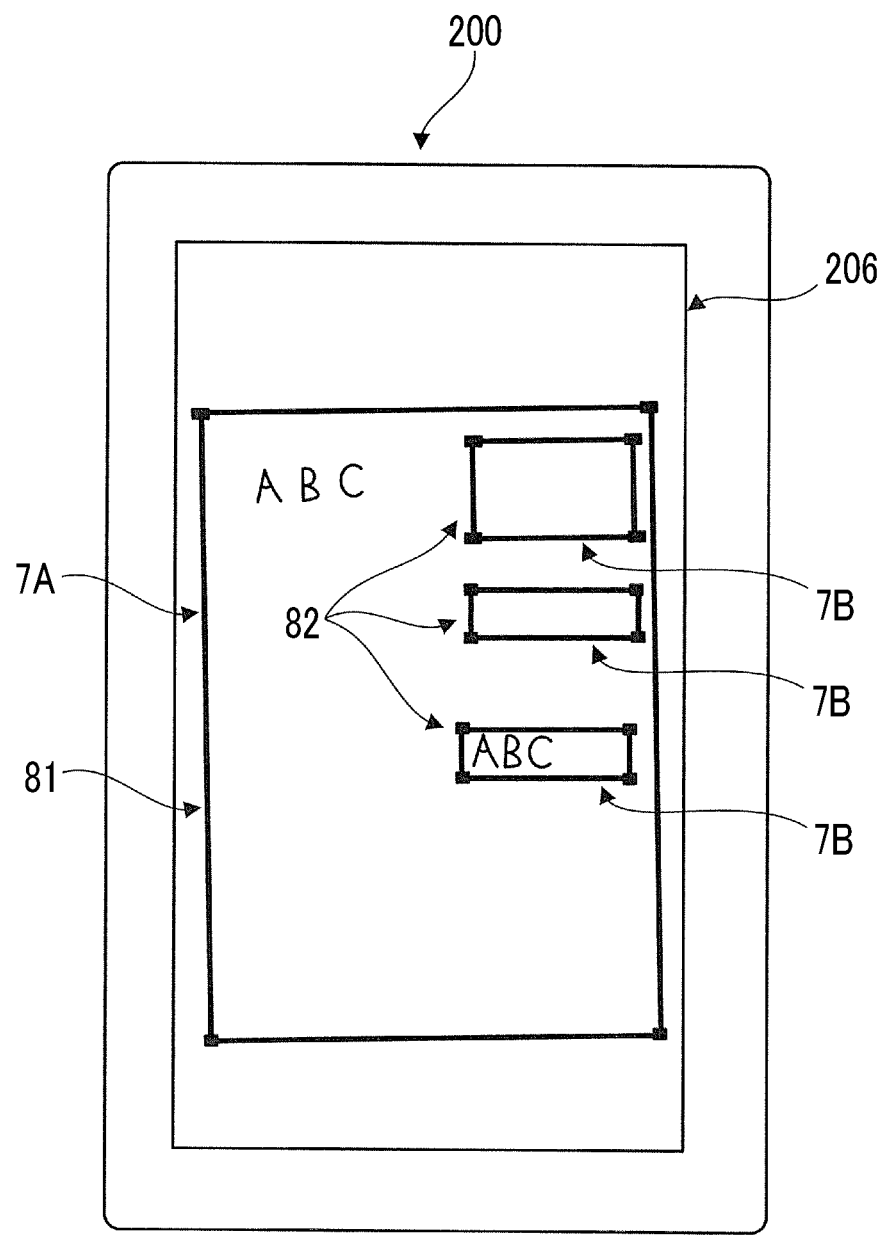
FIG. 7 is a diagram illustrating processing executed by the information processing apparatus regarding a captured image.

Further, FIG. 7 is a diagram illustrating processing executed by the information processing apparatus 200 regarding the captured image 70.

In the present exemplary embodiment, in a case where the input receiving unit 210 receives an input of the captured image 70 and the operator performs a predetermined operation, as shown in step S101 of FIG. 5, the extraction unit 214 extracts an image of a rectangular shape (hereinafter, "rectangular image") included in the captured image 70.

Specifically, the extraction unit 214 performs a known processing such as binarization processing and extraction processing of contours and corners of the captured image 70 to extract a rectangular image.

FIG. 7 is a diagram illustrating a state after a rectangular image is extracted by the extraction unit 214.

In the present exemplary embodiment, as shown in FIG. 7, the extraction unit 214 extracts a rectangular image of a large size (see reference numeral 7A), and also extracts a rectangular image of a smaller size (see reference numeral 7B) than this large size.

In the present exemplary embodiment, manual adjustment processing by the operator, and adjustment processing for changing the shape of the extracted rectangular image can be received from the operator.

More specifically, an operator's operation for changing the shape of the rectangular image can be received through the display device 206 (touch panel).

In present exemplary embodiment, in a case where this adjustment processing is received, the shape (contour) of the extracted rectangular image is changed as shown in FIG. 5 (step S102).

Next, in the present exemplary embodiment, as illustrated in step S103 of FIG. 5, the extraction unit 214 extracts a first object 71 having a predetermined first feature from the captured image 70.

Specifically, the extraction unit 214 extracts a first object 71 having a document feature from the captured image 70.

More specifically, the extraction unit 214 extracts a rectangular image having a predetermined feature from the plural rectangular images extracted in step S101, and extracts the object represented by the extracted rectangular image (hereinafter, referred to as "first extracted rectangular image") as a first object 71 having a document feature.

In the present exemplary embodiment, in a case where the extraction unit 214 extracts the first object 71 having the document feature, the first image information acquisition unit 211 acquires the first extracted rectangular image representing the first object 71 as the first object image 81 (see FIG. 7).

Next, as shown in FIG. 5, the first image information acquisition unit 211 performs a perspective projection of the acquired first object image 81 (step S104).

In other words, the first image information acquisition unit 211 deforms the first object image 81 such that the sides facing each other of the first object image 81 are arranged along the display screen.

In addition, the first image information acquisition unit 211 performs correction processing on the acquired first object image 81 as necessary (step S105).

More specifically, the first image information acquisition unit 211 performs correction processing on the first object image 81, in a case where a part of the first object 71 is located behind the second object 72 and this part is hidden, as in the captured image 70 (see FIG. 4) of the present exemplary embodiment.

Details of this correction processing will be described later.

Next, in the present exemplary embodiment, as illustrated in step S106 of FIG. 5, the extraction unit 214 extracts a second object 72 having a predetermined second feature from the captured image 70.

Specifically, the extraction unit 214 extracts a second object 72 having a tag feature from the captured image 70.

More specifically, the extraction unit 214 extracts a rectangular image having a predetermined feature from the plural rectangular images extracted in step S101, and extracts the object represented by the extracted rectangular image (hereinafter, referred to as "second extracted rectangular image") as a second object 72 having a tag feature.

In the present exemplary embodiment, in a case where the extraction unit 214 extracts the second object 72 having a tag feature, the second image information acquisition unit 212 acquires the second extracted rectangular image representing the second object 72 as the second object image 82 (see FIG. 7).

Next, as shown in FIG. 5, the second image information acquisition unit 212 performs a perspective projection of each acquired second object image 82 (step S107).

In other words, as described above, the second image information acquisition unit 212 deforms the second object image 82 such that the sides facing each other of the second object image 82 are arranged along the display screen.

Thereafter, the second image information acquisition unit 212 acquires position information of each of the second object images 82 (step S108).

In other words, the second image information acquisition unit 212 acquires information on the position of the second object image 82 with respect to the first object image 81.

More specifically, the second image information acquisition unit 212 acquires information about position of each of the plural second object images 82, with the upper left corner of the first object image 81 as the origin, for example.

Here, in the present exemplary embodiment, as illustrated in FIG. 4, a tag as an example of the second object 72 is in contact with a document as an example of the first object 71 and is attached to the document.

In other words, the tag as an example of the second object 72 is in contact with the document as an example of the first object 71 and is fixed to the document by adhesion.

In other words, the tag of the present exemplary embodiment constitutes a part of a document larger than the tag and is an object belonging to the document.

Here, in the present exemplary embodiment, as described above, the extraction unit 214 extracts the first object 71 having a document feature from the captured image 70.

Further, the extraction unit 214 extracts a second object 72 having a tag feature from the captured image 70.

In other words, the extraction unit 214 extracts the first object 71 that is likely to be a document and the second object 72 that is likely to be a tag, from the captured image 70.

Here, in the extraction of the first object 71 and the second object 72 from the captured image 70, the extraction unit 214 extracts the first object 71 and the second object 72, for example, based on the position of each object in the captured image 70.

Specifically, for example, the extraction unit 214 extracts a rectangular image located at the center of the captured image 70 or at the location closest to the center, among the plural rectangular images (extraction elements) extracted from the captured image 70, as a rectangular image representing the first object 71.

Then, the extraction unit 214 extracts the object represented by the extracted rectangular image as the first object 71.

In addition, for example, the extraction unit 214 extracts another rectangular image located closer to the edge side of the captured image 70 than the center of the captured image 70, among the plural rectangular images extracted from the captured image 70, as a rectangular image representing the second object 72.

Then, the extraction unit 214 extracts the object represented by the extracted rectangular image as the second object 72.

In addition, the extraction unit 214 extracts the first object 71 and the second object 72, based on the size of each rectangular image in the captured image 70, for example.

Specifically, the extraction unit 214 extracts, for example, the largest rectangular image from among the plural rectangular images extracted from the captured image 70 as a rectangular image representing the first object 71, and extracts the object represented by this rectangular image as the first object 71.

Further, the extraction unit 214 extracts, for example, a rectangular image smaller than the largest rectangular image from among the plural rectangular images extracted from the captured image 70 as a rectangular image representing the second object 72, and extracts the object represented by this rectangular image as the second object 72.

For example, the extraction unit 214 extracts a rectangular image of which the ratio of the area to the captured image 70 exceeds a predetermined ratio and is largest, among the plural rectangular images extracted from the captured image 70, as a rectangular image representing the first object 71.

Then, the extraction unit 214 extracts the object represented by this rectangular image as the first object 71.

For example, the extraction unit 214 extracts a rectangular image which is smaller than the largest rectangular image and of which the ratio of the area to the captured image 70 is smaller than a predetermined ratio, among the plural rectangular images extracted from the captured image 70, as a rectangular image representing the second object 72.

Then, the extraction unit 214 extracts the object represented by this rectangular image as the second object 72.

In addition, the extraction unit 214 extracts the first object 71 and the second object 72, based on the color of each rectangular image in the captured image 70, for example.

Specifically, for example, the extraction unit 214 extracts a white rectangular image from among the rectangular images included in the captured image 70 as a rectangular image representing the first object 71, and extracts the object represented by this rectangular image as the first object 71.

For example, the extraction unit 214 extracts a fluorescent color rectangular image from among the rectangular images included in the captured image 70 as a rectangular image representing the second object 72, and extracts the object represented by this rectangular image as the second object 72.

In other words, in the present exemplary embodiment, the extraction unit 214 extracts, for example, a rectangular image that is likely to be a document from among the rectangular images included in the captured image 70, as a rectangular image representing the first object 71. Then, the extraction unit 214 extracts the object represented by the extracted rectangular image as the first object 71.

Here, whether or not the image is a rectangular image that is highly likely to be a document is determined based on, for example, information such as the position of the rectangular image, the size of the rectangular image, and the color of the rectangular image.

In addition, it may be determined whether the image is a rectangular image that is highly likely to be a document using machine learning or the like.

In the present exemplary embodiment, the extraction unit 214 extracts, for example, a rectangular image that is likely to be a tag from among the rectangular images included in the captured image 70, as a rectangular image representing the second object 72. Then, the extraction unit 214 extracts the object represented by the extracted rectangular image as the second object 72.

Here, whether or not the image is a rectangular image that is highly likely to be a tag is determined based on information such as the position of the rectangular image, the size of the rectangular image, and the color of the rectangular image, as described above.

In addition, it may be determined whether the image is a rectangular image that is highly likely to be a tag using machine learning or the like.

In the present exemplary embodiment, the extraction unit 214 automatically extracts the first object 71 and the second object 72.

Therefore, in the present exemplary embodiment, the operator who operates the information processing apparatus 200 may not specify (extract) the first object 71 and the second object 72 by himself or herself.

In addition, in the present exemplary embodiment, even in a case where the operator does not perform an operation on the display device 206 (touch panel) (even in a case where the first object 71 and the second object 72 are not designated), the first object 71 and the second object 72 are extracted.

In the present exemplary embodiment, the objects extracted by the extraction unit 214 are determined in advance, and objects that satisfy the extraction conditions are extracted as the first object 71 and the second object 72.

Thereafter, in the present exemplary embodiment, as shown in step S109 of FIG. 5, the first image information acquisition unit 211 performs optical character recognition (OCR) processing on the first object image 81, and acquires character information (text information) included in the first object image 81.

Further, the second image information acquisition unit 212 performs OCR processing on the second object image 82, and acquires character information (text information) included in the second object image 82.

Thereafter, the information obtained by the processing in steps S101 to S109 is stored in the information storage unit 215 in a state of being associated with each other (step S110).

Specifically, the first object image 81, attribute information of the first object image 81 (information on the first object image 81 such as information indicating that the object represented by the first object image 81 is a document), character information obtained from the first object image 81, the second object image 82, attribute information of the second object image 82 (information on the second object image 82 such as information indicating that the object represented by the second object image 82 is a tag), character information obtained from the second object image 82, and position information of the second object image 82 are stored in the information storage unit 215 in a state of being associated with each other.

Hereinafter, in the present specification, these pieces of information stored in the information storage unit 215 in a state of being associated with each other (these pieces of information relating to one captured image 70) are referred to as captured image correspondence information.

With reference to FIG. 6, the flow of processing after the captured image correspondence information is acquired will be described.

In step 201, it is determined whether or not the captured image correspondence information is stored in the information storage unit 215.

In a case where it is determined in step S201 that the captured image correspondence information is stored, the process proceeds to step S202, and the first object image 81 included in the captured image correspondence information is acquired.

Then, the format of the first object image 81 is converted into a specific format (step S203).

More specifically, the format of the first object image 81 is converted into, for example, a DocuWorks (registered trademark) format or a PDF (registered trademark) format.

In the present exemplary embodiment, the first object image 81 after the format conversion is added to the captured image correspondence information.

Next, in the present exemplary embodiment, the second object image 82 included in the captured image correspondence information is acquired (step S204).

In the present exemplary embodiment, the second object image 82 is analyzed, and the color information of the second object image 82 is acquired (step S205).

Next, in the present exemplary embodiment, this color information is added to the captured image correspondence information.

More specifically, the color information is included in the attribute information of the second object image 82.

Thereafter, in the present exemplary embodiment, the display control unit 213 performs display processing on the first object image 81 and the second object image 82.

Figure 8:
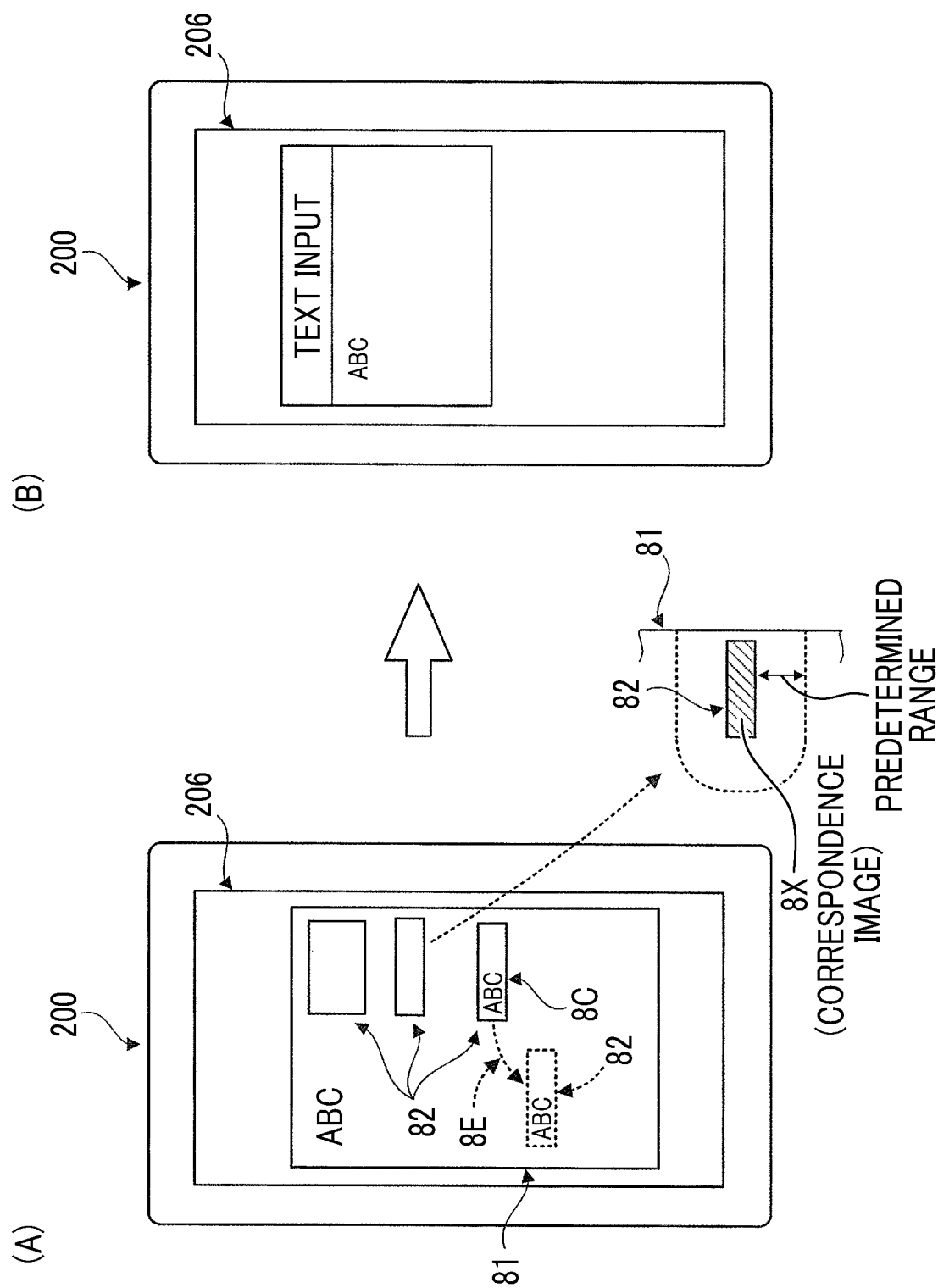
FIG. 8 is a diagram illustrating display processing in the information processing apparatus.

A part A in FIG. 8 (a diagram illustrating display processing in the information processing apparatus 200) shows a state after the first object image 81 and the second object image 82 are displayed on the display device 206 of the information processing apparatus 200.

As illustrated in the part A in FIG. 8, the display control unit 213 displays the first object image 81 and the second object image 82 on the display device 206.

Further, in displaying the first object image 81 and the second object image 82 on the display device 206, the display control unit 213 displays the first object image 81 and the second object image 82 in a state where the positional relationship between the first object 71 and the second object 72 in the captured image 70 (see FIG. 4) is maintained.

More specifically, the display control unit 213 displays the first object image 81, and displays the second object image 82 at the position specified by the position information.

Thus, in the present exemplary embodiment, the first object image 81 and the second object image 82 are displayed on the display device 206 in a state in which the positional relationship between the first object 71 and the second object 72 in the captured image 70 is maintained.

Further, in displaying the first object image 81 and the second object image 82 on the display device 206, the display control unit 213 displays the first object image 81 and the second object image 82 in a state where the ratio between the size of the first object 71 and the size of the second object 72 in the captured image 70 (see FIG. 4) is maintained.

In other words, the display control unit 213 displays the first object image 81 and the second object image 82 such that the ratio between the size of the first object 71 and the size of the second object 72 in the captured image 70 and the ratio between the size of the first object image 81 and the size of the second object image 82 on the display screen of the display device 206 match each other.

Further, in a case where the first object 71 and the second object 72 overlap each other in the captured image 70 (see FIG. 4), the display control unit 213 displays the first object image 81 and the second object image 82 in an overlapping manner on the display device 206 as shown in the part A of FIG. 8.

In addition, in a case where the second object 72 is attached to the first object 71 from above in the captured image 70, the display control unit 213 displays the first object image 81 and the second object image 82 such that the first object image 81 and the second object image 82 overlap and the second object image 82 is positioned above the first object image 81.

Here, "above" refers to a state of being positioned on the near side as viewed from the photographer in a case of capturing the captured image 70 or the operator referring to the information processing apparatus 200.

In a case where the first object 71 and the second object 72 overlap, and the second object 72 is positioned in front of the first object 71 in the captured image 70, the display control unit 213 displays on the display device 206, the first object image 81 and the second object image 82 by being overlapped, and the second object image 82 is further displayed in front of the first object image 81.

Further, in the present exemplary embodiment, the display control unit 213 may display the second object image 82 in the same format as the first object image 81, but may display the second object image 82 in a different format.

In this case, the second object image 82 may be displayed in the same format as the format used in a case of displaying the second registered image which is registered in advance.

In the present exemplary embodiment, a second registered image, which is a registered image representing a tag, is registered in advance in the information processing apparatus 200, and separately from the second object image 82, the second registered image registered in advance is displayed.

For example, in the information processing apparatus 200, a registered image representing a tag that can be added to an image in the DocuWorks (registered trademark) format (that is, xdw format) is registered in advance.

The display control unit 213 can display an image representing a tag in a pre-registered format called annotation in a manner to be added to an image in xdw format.

In displaying the second object image 82, the display control unit 213 may display the second object image 82 in the same format as the format used in a case where the second registered image is displayed.

In the present exemplary embodiment, the display control unit 213 can display the second registered image on the display device 206, without depending on the reception of the captured image 70 by the input receiving unit 210 (even in a case where the captured image 70 is not received by the input receiving unit 210).

In displaying the second object image 82, the display control unit 213 according to the present exemplary embodiment may display the second object image 82 not only in its original format, but also in the same format as the display format in a case of displaying the second registered image.

Here, "displaying the second object image 82 in the same format as the second registered image" means that displaying the second object image 82, in a state where that same operation as the operation that the operator performs on the second registered image is performed on the second object image 82.

In other words, "displaying the second object image 82 in the same format as the second registered image" means that displaying the second object image 82, in a state where at least one of the operations that the operator performs on the second registered image is performed on the second object image 82.

For example, in the present exemplary embodiment, regarding the second registered image representing the tag, the operator can change the size, color, shape, and position of the second registered image.

Accordingly, in the present exemplary embodiment, the second object image 82 can be displayed such that any one or more of the size, color, shape, and position of the second object image 82 can be changed.

Further, the present exemplary embodiment relates to a second registered image representing a tag, and an operator can edit character information (text information) attached to the second registered image.

Accordingly, in the present exemplary embodiment, the second object image 82 is displayed such that the character information (text) attached to the second object image 82 can be edited.

In addition, in the second registered image, each of plural elements constituting the second registered image can be changed.

In the present exemplary embodiment, the elements included in the plural elements can be changed also in the second object image 82.

In other words, also in the second object image 82, at least one element among plural elements that can be changed in the second registered image can be changed.

Here, in a case of displaying the second object image 82 in the same format as the second registered image, the display control unit 213 displays the second object image 82 by reflecting, for example, at least one of a size, color, or shape of the second object 72 in the second object image 82.

Further, in a case of displaying the second object image 82 in the same format as the format of the second registered image, the display control unit 213 displays the characters included in the second object image 82 as editable character information.

In other words, the text is displayed as text character information.

In other words, in the present exemplary embodiment, in a case of displaying the second object image 82, the first object image 81 and the second object image 82 are displayed in a state where the second object image 82 is editable.

Here, "editable" refers to the state where the elements constituting the second object image 82, such as the size, color, and shape of the second object image 82, and characters displayed on the second object image 82 can be changed.

Specifically, in the present exemplary embodiment, by the operator performing a predetermined operation on the information processing apparatus 200 (for example, performing an operation on the display device 206), the elements constituting the second object image 82 can be changed.

Here, in the present exemplary embodiment, for example, in a case where the operator presses the second object image 82 indicated by reference numeral 8C on the display screen shown in the part A of FIG. 8, for example, a screen shown in a part B of FIG. 8 is displayed.

The user can edit characters by performing an operation on the screen shown in the part B of FIG. 8.

Specifically, it is possible to delete a character, add a character, change a font, and change a character size.

Although illustration is omitted, in the present exemplary embodiment, in a case where the operator operates the display device 206 to move elements constituting the contours such as corners and sides of the second object image 82, the size and shape of the second object image 82 are changed.

Further, in the present exemplary embodiment, in a case where the operator performs a predetermined operation (not shown) on the display device 206, a screen for designating the color of the second object image 82 is displayed.

In a case where the operation on this screen is performed, the color of the second object image 82 is changed.

The first object image 81 may be editable. However, in a case where the first object image 81 is in a format different from the format of the second object image 82, there are differences in the elements and levels that can be edited.

The first object image 81 may have fewer editable elements than the second object image 82.

For example, with respect to the first object image 81, the character may not be deleted, and the color may not be changed.

In the present exemplary embodiment, it is further possible to switch between a display mode in which the second object image 82 is displayed in the same format as the second registered image and a display mode in which the second object image 82 itself is displayed.

In addition, in the present exemplary embodiment, the user performs a predetermined operation such as pressing a switching button (not shown) displayed on the display device 206.

Figure 9:
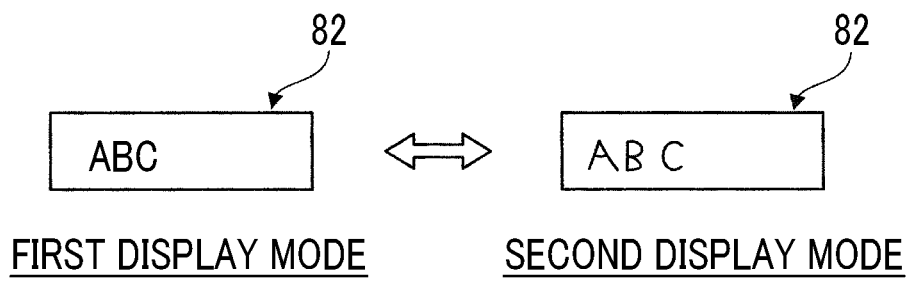
FIG. 9 is a diagram showing a display mode of a second object image.

Accordingly, in the present exemplary embodiment, as shown in FIG. 9 (a diagram showing a display mode of the second object image 82), the first display mode for displaying the second object image 82 in the same format as the second registered image and the second display mode for displaying the second object image 82 itself can be switched.

Here, in the second display mode in which the second object image 82 itself is displayed, the character information before the OCR processing is displayed.

In other words, an image of a character handwritten by the user (an image) is displayed.

On the other hand, in the first display mode in which the second object image 82 is displayed in the same format as the second registered image, text characters are displayed and the characters are displayed in a state where the characters can be edited.

Figure 10:
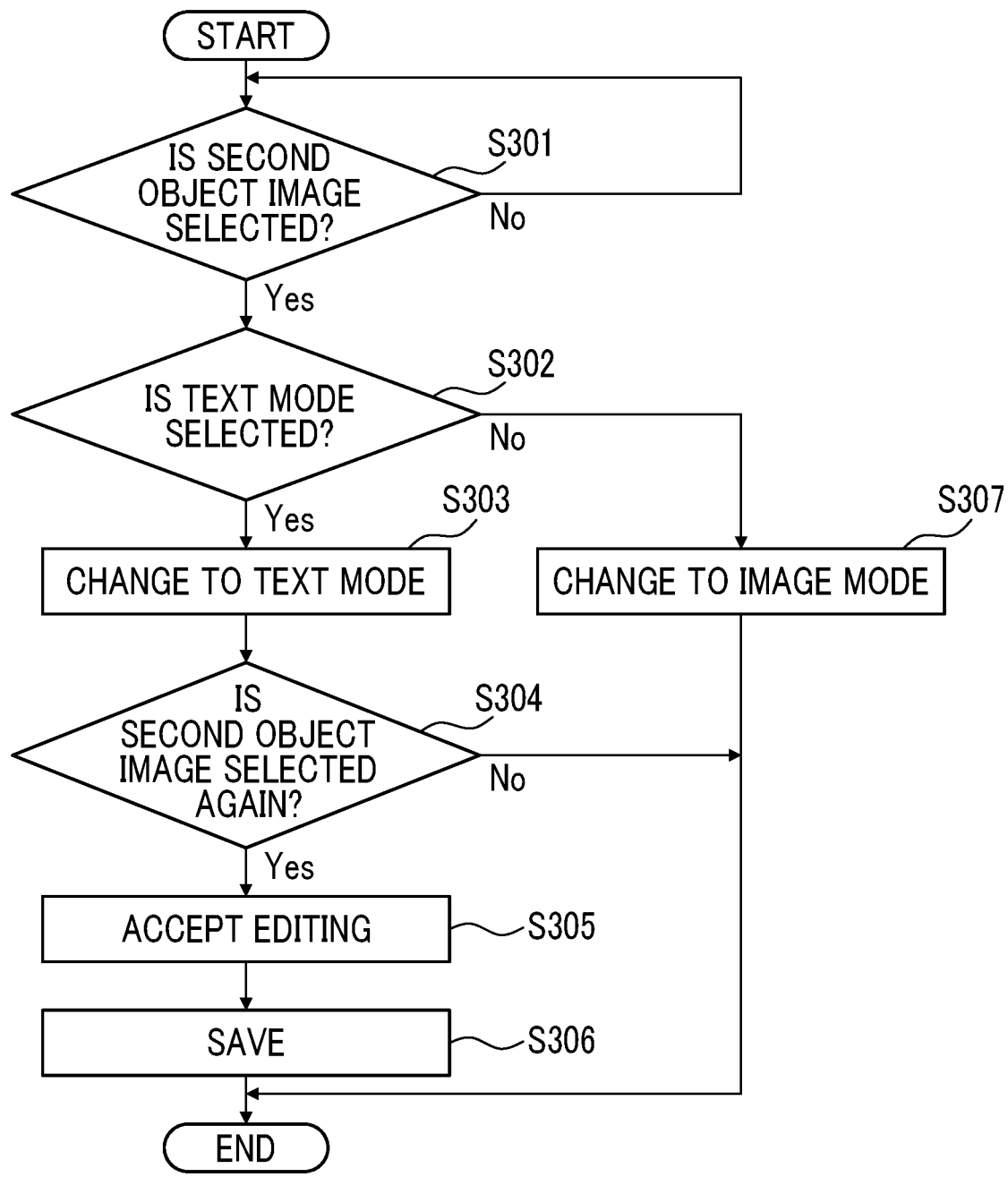
FIG. 10 is a flowchart showing details of processing in a case where display processing is executed.

FIG. 10 is a flowchart showing details of processing in a case where the display processing described in the part B of FIG. 8 is executed.

In the present exemplary embodiment, first, it is determined whether or not the second object image 82 is selected by the user (step S301).

In a case where the second object image 82 is selected, it is determined whether or not the user selects the text mode (step S302).

In other words, it is determined whether a predetermined operation for selecting the text mode, such as pressing of a selection button (not shown), is performed by the operator.

In a case where it is determined in step S302 that the text mode is selected, the mode is changed to the text mode (step S303).

Thereafter, in the present exemplary embodiment, it is determined whether or not the second object image 82 is selected again by the operator (step S304). In a case where the second object image 82 is selected again, as shown in the part B of FIG. 8, a screen for accepting editing of characters is displayed.

In other words, in the present exemplary embodiment, in a case where a predetermined operation is performed by the operator, a screen for accepting editing of characters is displayed.

In a case where there is editing by the user, this editing is accepted (step S305).

Then, the edited content is saved (step S306).

More specifically, the edited content is included (reflected) in the captured image correspondence information.

On the other hand, in a case where in step 302, the text mode is not selected, and for example, the image mode is selected, the mode is changed to the image mode (step S307).

In this image mode, the second object image 82 itself is displayed.

In other words, in this image mode, the second object image 82 is displayed in the second display mode shown in FIG. 9.

In this case, the handwritten writing content by the user is displayed.

In the present exemplary embodiment, in a case where the character is edited and the content of the character information is changed in step S305, thereafter, the mode is not changed to the image mode.

In other words, the second object image 82 cannot be displayed in the second display mode in which the second object image 82 itself is displayed.

Thereby, it is suppressed that the contents of the characters displayed in the text mode and the contents of the characters displayed in the image mode do not match.

In the present exemplary embodiment, in displaying the first object image 81 and the second object image 82, the display control unit 213 displays the first object image 81 and the second object image 82 in a state where the second object image 82 can be moved with respect to the first object image 81.

Thus, in the present exemplary embodiment, the operator can move the second object image 82, as indicated by reference numeral 8E in the part A of FIG. 8, by, for example, dragging and dropping the second object image 82.

In addition, in the state of the captured image 70, the second object cannot be moved, but in the present exemplary embodiment, the second object image 82 can be moved by performing the above-described processing, and the position of the second object image 82 with respect to the first object image 81 can be changed.

In the present exemplary embodiment, plural second object images 82 are displayed, but each of the plural second object images 82 can be moved individually.

In the present exemplary embodiment, the first object image 81 can also be moved separately from the second object image 82.

Next, the correction processing for the first object image 81 described in step S105 in FIG. 5 will be described.

In a case where the first object 71 and the second object 72 overlap, and a part of the first object 71 is located behind the second object 72 (see FIG. 4) in the captured image 70, the display control unit 213 changes an image of a portion corresponding to this part of the first object image 81 (the image indicated by the hatched line of the reference numeral 8X in the part A of FIG. 8) (hereinafter referred to as "corresponding image 8X").

Specifically, for example, the display control unit 213 changes the corresponding image 8X to an image of another portion of the first object image 81.

Here, in the present exemplary embodiment, as described above, the second object image 82 may be moved. In a case where the second object image 82 is moved, the first object image 81 is chipped.

Therefore, in the present exemplary embodiment, the portion where the chipping occurs is complemented with another image.

In a case where the corresponding image 8X included in the first object image 81 is changed to an image of another portion of the first object image 81, it is preferable that the image of the another portion is the image located within a predetermined range from the corresponding image 8X, for example.

In other words, in a case where the corresponding image 8X of the first object image 81 is changed to an image of another portion of the first object image 81, it is preferable that the corresponding image 8X is changed to another image located within a predetermined distance from the corresponding image 8X, for example.

In other words, it is preferable to replace the corresponding image 8X with another image that is located in the vicinity of the corresponding image 8X and hardly causes discomfort even in a case of replacement, for example.

Further, in a case where the first object image 81 is an image obtained by capturing a print document, the display control unit 213 may change the corresponding image 8X to an image based on a part of the image data that is the basis of the print document.

In addition, in a case where the first object image 81 is an image obtained by capturing a print document, the corresponding image 8X may be changed to the image located in a location corresponding to the corresponding image 8X among the images based on the image data that is the basis of the print document.

In order to acquire the image data that is the basis of the print document, for example, the first object image 81 that is an image obtained by capturing the print document is analyzed, and for example, identification information such as a code image attached to the print document is acquired.

Based on this identification information, a database or the like is searched to specify and acquire the image data that is the basis of the print document.

Then, the display control unit 213 changes the corresponding image 8X to an image based on a part of the acquired image data.

In the acquisition of the image data that is the basis of the print document, the image data may be acquired by extracting image data having an image that approximates the print document from a database or the like by using machine learning, for example.

In the above description, in displaying the first object image 81, the first object image 81 itself is displayed or the first object image 81 is displayed in a format for displaying the first registered image.

However, the present invention is not limited to this. For example, as described above, the image data that is the basis of the print document may be acquired, and an image based on the image data may be displayed as the first object image 81.

In other words, in a case where the first object image 81 is an image obtained by capturing a print document, the display control unit 213 may display an image based on the image data that is the basis of the print document instead of the first object image 81.

Others

Figure 11:
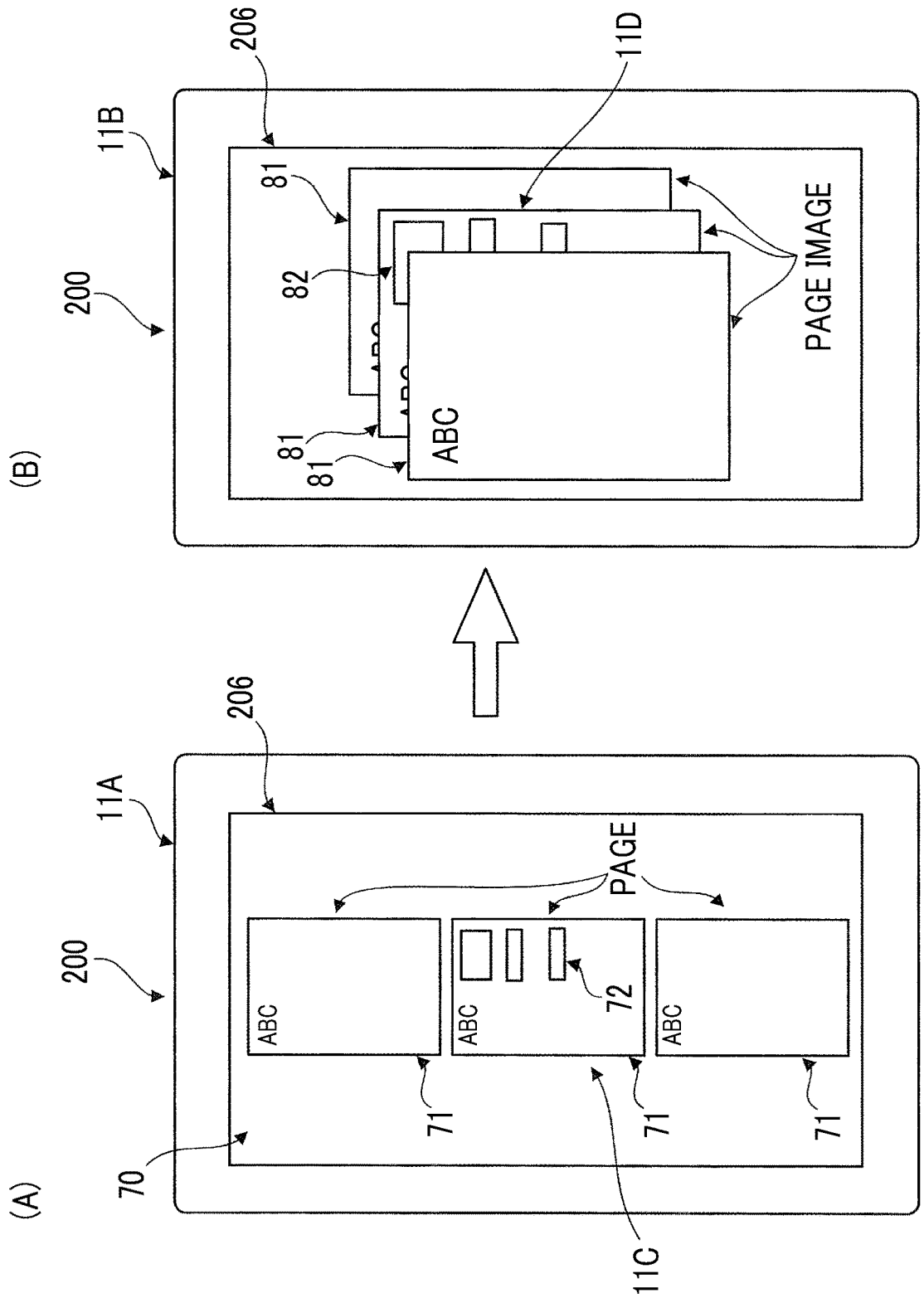
FIG. 11 is a diagram illustrating another example of processing related to a captured image.

As indicated by reference numeral 11A in FIG. 11 (diagrams illustrating another example of processing related to a captured image), in a case where the captured image 70 is composed of images of plural pages, the display control unit 213 displays plural page images, which are images corresponding to respective pages, on the display device 206, as indicated by the reference numeral 11B.

In addition, in a case where there are the first object 71 and the second object 72 on one page that is the basis of the page image (see reference numeral 11C), the display control unit 213 displays both the first object image 81 and the second object image 82 on the page image corresponding to this page, as indicated by the reference numeral 11D.

FIG. 12 is a diagram illustrating another example of processing related to a captured image.

In addition, as illustrated in a part A of FIG. 12, in a case where the captured image 70 is composed of images of plural pages, and the second object 72 is recorded over plural pages, as illustrated in a part B of FIG. 12, the display control unit 213 may display plural second object images 82 on one specific page image among the plural page images.

In other words, in a case where the captured image 70 is composed of images of plural pages, and plural page images each of which is an image corresponding to each page are displayed on the display device 206, the display control unit 213 may collectively display plural second object images 82 on one specific page image.

More specifically, in this example shown in the part B of FIG. 12, plural second object images 82 are collectively displayed on the first page.

Here, in the captured image 70, as shown in the part A of FIG. 12, the second object 72 may be recorded over plural pages.

In this case, as described above, in a case where the plural second object images 82 are collectively displayed on one specific page image, the operator can refer to all of the second object images 82 in a shorter time.

Figure 13:
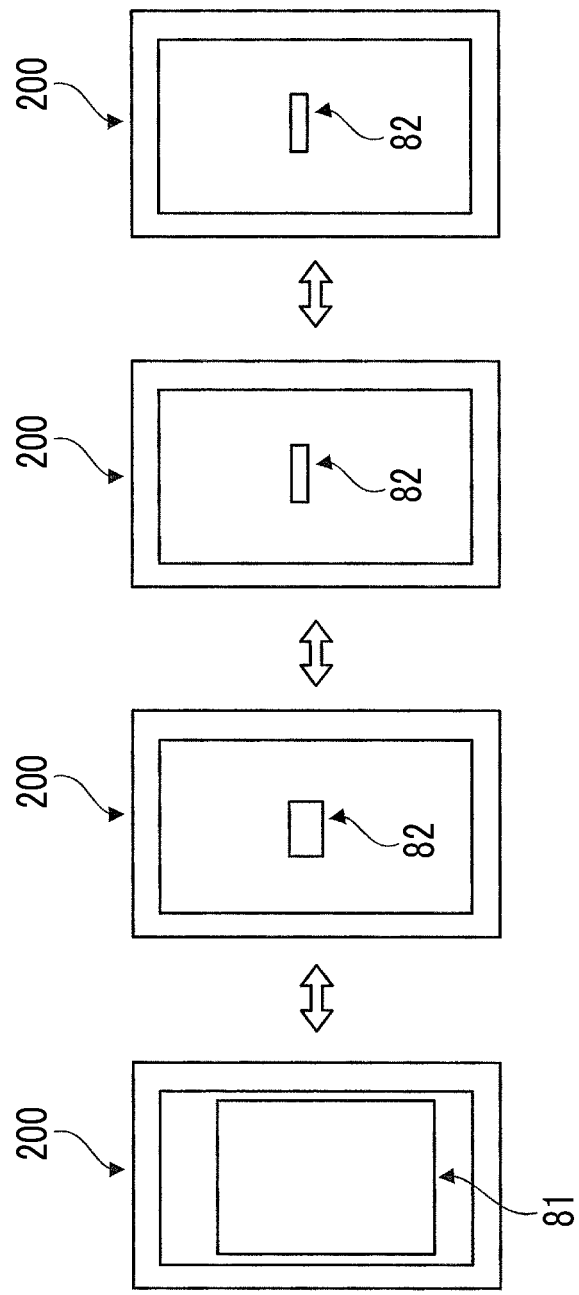
FIG. 13 is a diagram showing another display example in the information processing apparatus.

In the above description, the first object image 81 and the second object image 82 are displayed on a common screen, but as shown in FIG. 13 (a diagram showing another display example in the information processing apparatus), the first object image 81 and the second object image 82 may be displayed individually and on different screens.

In the display mode shown in FIG. 13, the screen is switched and the displayed object image is switched, by the operator performing a predetermined operation.

Specifically, in this display mode, the operator performs a so-called swipe operation on the display screen, so the displayed object image is switched.

In the above description, the first object image 81 and the second object image 82 are displayed in a state where the second object image 82 is placed on the first object image 81.

Figure 14:
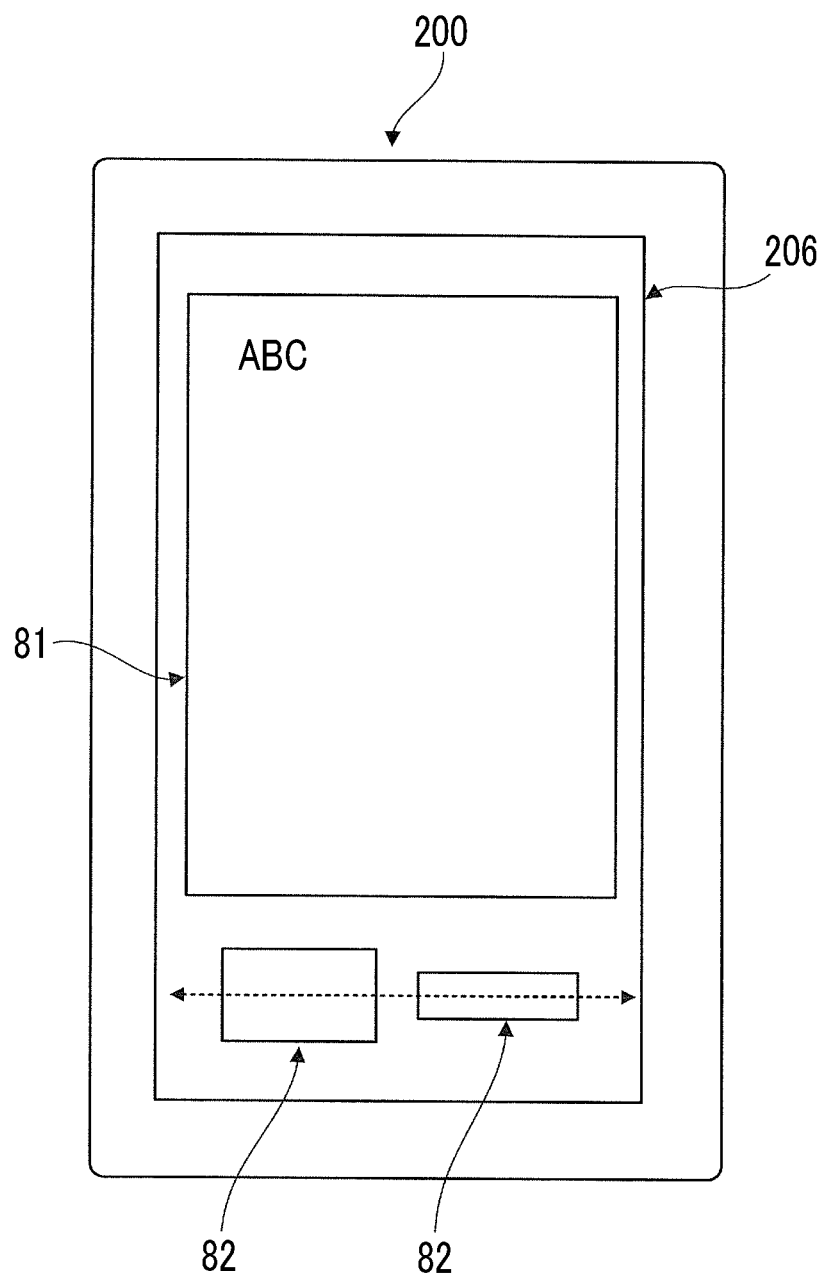
FIG. 14 is a diagram showing another display example in the information processing apparatus.

However, the present invention is not limited to this, and for example, as shown in FIG. 14 (a diagram showing another display example in the information processing apparatus), the second object image 82 may be displayed at a different location from the display location of the first object image 81.

In FIG. 14, the second object image 82 is displayed below the display location of the first object image 81.

Further, in this display mode, the displayed second object image 82 is switched by the operator performing a predetermined operation.

Specifically, in this display mode, by the operator performing a so-called swipe operation on the display screen, the second object image 82 slides in the horizontal direction, and the displayed second object image 82 is switched.

In the above description, as an example, in displaying the first object image 81 and the second object image 82, the first object image 81 and the second object image 82 themselves are displayed, or the first object image 81 and the second object image 82 are displayed in the same formats as the first registered image and the second registered image.

However, the present invention is not limited to this, and in displaying the first object image 81 and the second object image 82, the first registered image and the second registered image may be displayed instead of the first object image 81 and the second object image 82.

In this case, at least a part of the feature of the first object image 81 and at least apart of the feature of the second object image 82 are reflected in the first registered image and the second registered image.

Specifically, in this case, for example, any one or more of the plural elements such as the color, shape, and size of the first object image 81 and the second object image 82 are reflected in the first registered image and the second registered image.

In addition, in displaying the first registered image and the second registered image instead of the first object image 81 and the second object image 82, in the case where the first object image 81 and the second object image 82 contain a character image, the character image may be displayed on the first registered image and the second registered image.

In the above description, with respect to both the first object image 81 and the second object image 82, the object images are displayed as the object images themselves, the object images are displayed in the same format as the registered images, and the registered images are displayed instead of the object images.

However, the present invention is not limited to this, only one of the first object image 81 and the second object image 82 may be displayed in any one of these display modes, and the other may be displayed in a small number of display modes than the number of these display modes.

Specifically, for example, with respect to the first object image 81, only the first object image 81 itself may be displayed, and with respect to the second object image 82, for example, the object image itself may be displayed, the object image may be displayed in the same format as the registered image, or the registered image may be displayed instead of the object image.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
receive an input of a captured image in which a first object and a second object attached within the first object are recorded;
acquire a first object image that is an image of the first object extracted from the captured image;
acquire a second object image that is an image of the second object extracted from the captured image; and
display both the first object image and the second object image in a state where the second object image is movable relative to the first object image;
wherein in a case where the first object and the second object overlap and a part of the first object is located behind the second object, the processor changes an image of a portion of the first object image corresponding to the part of the first object to an image corresponding to another portion located in a vicinity of the part and within a predetermined range from the part.

2. The information processing apparatus according to claim 1,
wherein the processor further extracts the first object having a predetermined first feature from the captured image, and extracts the second object having a predetermined second feature different from the first feature from the captured image.

3. The information processing apparatus according to claim 1,
wherein the processor displays the first object image and the second object image, in a state where a positional relationship between the first object and the second object in the captured image is maintained.

4. The information processing apparatus according to claim 1,
wherein the processor displays the first object image and the second object image, in a state where a ratio between a size of the first object in the captured image and a size of the second object in the captured image is maintained.

5. The information processing apparatus according to claim 1,
wherein the processor displays the first object image and the second object image in an overlapping manner, in a case where the first object and the second object overlap in the captured image.

6. The information processing apparatus according to claim 1,
wherein in a case where the second object is attached to the first object from above in the captured image, the processor displays the first object image and the second object image such that the first object image and the second object image overlap and the second object image is positioned above the first object image.

7. The information processing apparatus according to claim 1,
wherein the processor displays a registered image representing the second object which is registered in advance, without receiving the captured image, and
wherein the processor displays the second object image in the same format as the registered image.

8. The information processing apparatus according to claim 7,
wherein the processor displays a registered image representing a tag as the registered image, and
wherein the processor displays the second object image in the same format as the registered image representing the tag.

9. The information processing apparatus according to claim 7,
wherein in displaying the second object image in the same format as the registered image, the processor displays the second object image by reflecting at least one of a size, color, or shape of the second object in the second object image.

10. The information processing apparatus according to claim 7,
wherein in displaying the second object image in the same format as the registered image, in a case where there is an image of a character on the second object, the processor displays the image of the character as editable character information.

11. The information processing apparatus according to claim 1,
wherein the processor displays the first object image and the second object image in different formats.

12. The information processing apparatus according to claim 1,
wherein in a case where the captured image is composed of images of a plurality of pages, the processor displays a plurality of page images each of which is an image corresponding to each page, and in a case where there are the first object and the second object in one page which is a basis of the page image, the processor displays both the first object image and the second object image on one page image corresponding to the one page.

13. The information processing apparatus according to claim 1,
wherein in a case where the captured image is composed of images of a plurality of pages, the processor displays a plurality of page images each of which is an image corresponding to each page, and in a case where the second object is recorded over a plurality of pages, the processor displays a plurality of the second object images on one specific page image among the plurality of displayed page images.

14. The information processing apparatus according to claim 1,
wherein in a case where the first object is a print document, the processor changes the image of the portion corresponding to the part to an image based on a part of image data which is a basis of the print document.

15. The information processing apparatus according to claim 1,
wherein in a case where the first object is a print document, the processor displays an image based on image data that is a basis of the print document, as the first object image.

16. A non-transitory computer readable medium storing a program causing a computer to execute:
an input receiving function of receiving an input of a captured image in which a first object and a second object attached within the first object are recorded;
a first image acquisition function of acquiring a first object image that is an image of the first object extracted from the captured image;
a second image acquisition function of acquiring a second object image that is an image of the second object extracted from the captured image; and
a display control function of displaying both the first object image and the second object image in a state where the second object image is movable relative to the first object image,
wherein in a case where the first object and the second object overlap and a part of the first object is located behind the second object, an image of a portion of the first object image corresponding to the part of the first object is changed to an image corresponding to another portion located in a vicinity of the part and within a predetermined range from the part.

17. An information processing method comprising:
receiving an input of a captured image in which a first object and a second object attached within the first object are recorded;
acquiring a first object image that is an image of the first object extracted from the captured image;
for acquiring a second object image that is an image of the second object extracted from the captured image; and
for displaying both the first object image and the second object image in a state where the second object image is movable relative to the first object image,
wherein in a case where the first object and the second object overlap and a part of the first object is located behind the second object, an image of a portion of the first object image corresponding to the part of the first object is changed to an image corresponding to another portion located in a vicinity of the part and within a predetermined range from the part.

18. An information processing apparatus comprising:
a processor configured to:
receive an input of a captured image in which a first object and a second object attached within the first object are recorded;

acquire a first object image that is an image of the first object extracted from the captured image;

acquire a second object image that is an image of the second object extracted from the captured image; and display both the first object image and the second object image, the processor displaying the first object image and the second object image in a state where an attribute of the second object image is editable, wherein the attributes of the second object image are size of the second object image, color of the second object image, shape of the second object image, or characters displayed in the second object image, wherein in a case where the first object and the second object overlap and a part of the first object is located behind the second object, the processor changes an image of a portion of the first object image corresponding to the part of the first object to an image corresponding to another portion located in a vicinity of the part and within a predetermined range from the part.

19. A non-transitory computer readable medium storing a program causing a computer to execute:

an input receiving function of receiving an input of a captured image in which a first object and a second object attached within the first object are recorded;

a first image acquisition function of acquiring a first object image that is an image of the first object extracted from the captured image;

a second image acquisition function of acquiring a second object image that is an image of the second object extracted from the captured image; and a display control function of displaying both the first object image and the second object image, the display control function displaying the first object image and the second object image in a state where an attribute of the second object image is editable, wherein the attributes of the second object image are size of the second object image, color of the second object image, shape of the second object image, or characters displayed in the second object image, wherein in a case where the first object and the second object overlap and a part of the first object is located behind the second object, an image of a portion of the first object image corresponding to the part of the first object is changed to an image corresponding to another portion located in a vicinity of the part and within a predetermined range from the part.

20. An information processing method comprising:

receiving an input of a captured image in which a first object and a second object attached within the first object are recorded;

acquiring a first object image that is an image of the first object extracted from the captured image;

acquiring a second object image that is an image of the second object extracted from the captured image; and displaying both the first object image and the second object image in a state where an attribute of the second object image is editable, wherein the attributes of the second object image are size of the second object image, color of the second object image, shape of the second object image, or characters displayed in the second object image, wherein in a case where the first object and the second object overlap and a part of the first object is located behind the second object, an image of a portion of the first object image corresponding to the part of the first object is changed to an image corresponding to another portion located in a vicinity of the part and within a predetermined range from the part.

\* \* \* \* \*